May 18, 1926.

C. P. PAULSEN 1,585,168

MILK BOTTLE CAP

Filed June 29, 1925

Inventor
C. P. Paulsen.
By E. W. Anderson Son.
Attorney

Patented May 18, 1926.

1,585,168

UNITED STATES PATENT OFFICE.

CHRISTIAN P. PAULSEN, OF SEATTLE, WASHINGTON.

MILK-BOTTLE CAP.

Application filed June 29, 1925. Serial No. 40,264.

The invention has relation to milk bottle caps, having for an object to provide a durable cap of this description of improved nature that can be washed and used again repeatedly. Other objects and advantages will appear hereinafter.

The invention consists in the novel construction and combinations of parts, as hereinafter set forth in the appended claim.

Figure 1:
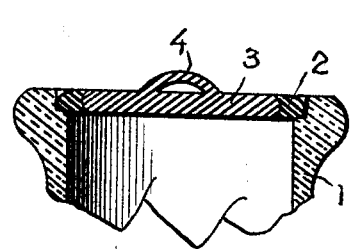
Figure 2:
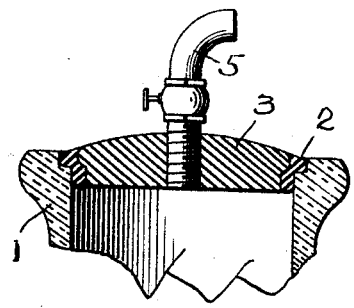

In the accompanying drawings illustrating the invention, Figure 1 is a central vertical section of the invention as applied to the bottle partly broken away; Figure 2 is a similar view of a modification.

In these drawings, the numeral 1 designates the milk bottle, and the cap of circular form has a circumferential marginal portion 2 of reduced thickness and formed of soft rubber, the body 3 of the cap being of hard rubber into which the soft rubber marginal portion is melted to form a closely adherent semi-integral joint, said body and marginal portion forming a substantially unitary whole provided with upper and lower smooth surfaces. Said joint admits, in case the soft rubber marginal portion becomes worn or defaced, of renewal of the latter by a new marginal portion, after the old marginal portion is detached by the use of heat.

The body of the cap is provided with an upward projecting integral loop 4 for lifting purposes.

In Figure 2 of the drawings a pouring tube or faucet 5 is threaded into the hard rubber body of the cap, which in this case is of modified form, being thicker than in the form shown in Figure 1 to carry said tube and projecting below the upper recess of the milk bottle, wherein the cap is seated. This form of the invention is designed mainly for the use of the housewife in pouring milk into bottles for the use of babies.

I claim:—

A milk bottle cap, having a stiff body portion of hard rubber, and a reduced comparatively thin flexible marginal portion of soft rubber having a semi-integral fused joint connection with said body portion and forming therewith a substantially unitary whole having upper and lower smooth surfaces.

In testimony whereof I affix my signature.

CHRISTIAN P. PAULSEN.